United States Patent [19]

Alam

[11] Patent Number: 5,230,652
[45] Date of Patent: Jul. 27, 1993

[54] FISH CLEANING DEVICE

[76] Inventor: Mohammed Alam, 159-14 Normal Rd., Jamaica, N.Y. 11432

[21] Appl. No.: 926,720

[22] Filed: Aug. 7, 1992

[51] Int. Cl.$^5$ ............................................. A22C 25/02
[52] U.S. Cl. ...................................... 452/98; 452/99; 452/105
[58] Field of Search ................ 452/98, 99, 101, 105, 452/173

[56] References Cited

U.S. PATENT DOCUMENTS

| | | | |
|---|---|---|---|
| 1,204,993 | 11/1916 | Keller | 452/99 |
| 1,440,960 | 1/1923 | Brown et al. | 452/101 |
| 1,615,134 | 1/1927 | Price | 452/99 |
| 1,746,813 | 2/1930 | Barry | 452/101 |
| 2,516,414 | 7/1950 | Pilliod | 452/105 |
| 2,557,272 | 6/1951 | Gabriel | 452/101 |
| 2,672,648 | 3/1954 | Kaplan | 452/99 |
| 3,248,751 | 5/1966 | Wilburn | 452/105 |
| 3,270,368 | 9/1966 | Cook, Sr. et al. | 452/105 |
| 4,106,193 | 8/1978 | Fisher et al. | 30/172 |
| 4,297,765 | 11/1981 | Altman et al. | 452/81 |
| 4,761,856 | 8/1988 | Ewing | 452/154 |

FOREIGN PATENT DOCUMENTS

PCT/AU84/-
00018 8/1984 Australia .

OTHER PUBLICATIONS

"Handy Fish Scaler"-J. T. Scotchline, Stock No. 29-FS Jeros Tackle Co. Inc., Carteret, N.J. 07008.

Primary Examiner—Willis Little
Attorney, Agent, or Firm—Kuhn and Muller

[57] ABSTRACT

A fish scaling device having a dual cutting blade for alternately removing scales of a fish and thereafter removing the inner visceral tissues of the fish. The device preferably includes a pair of upper sharp surfaces having mutually opposite end points, with the upper sharp surfaces each being convex in shape and defining a gap therebetween. The convex surfaces adapt to the inner visceral concave surfaces of the inside of the fish being cleaned. In addition, oppositely disposed to the sharp, smooth blade surfaces are a pair of convex serrated blades having mutually opposite end points, with the serrated blades defining a gap therebetween. In an alternate version a rotating blade set is provided with alternate serrated and generally sharp, smooth blade surfaces.

4 Claims, 2 Drawing Sheets

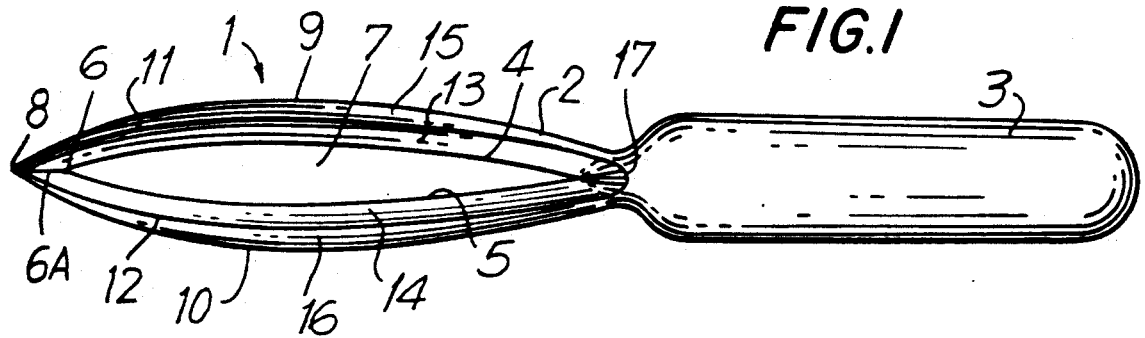
FIG.1
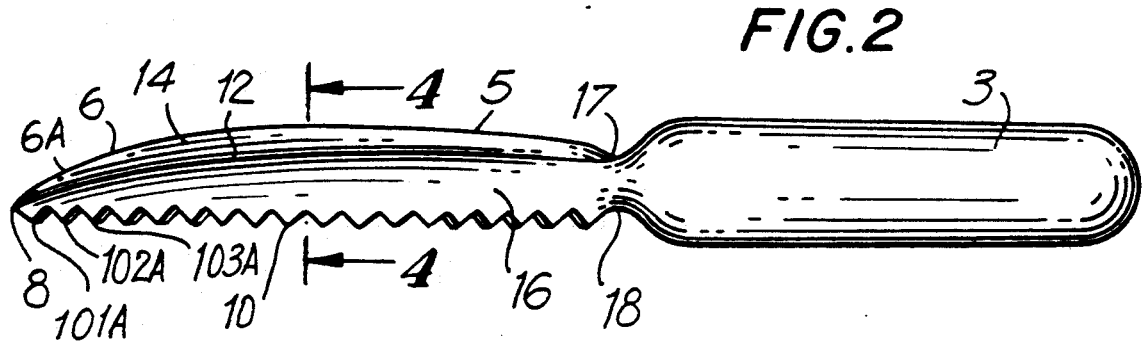
FIG.2
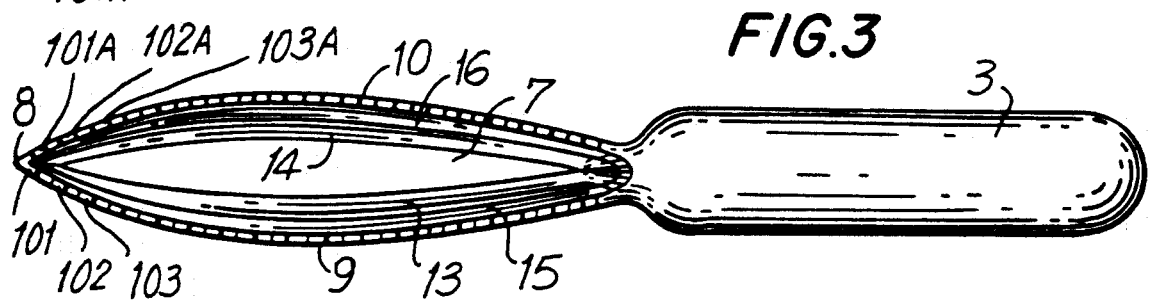
FIG.3
FIG.4
FIG.5
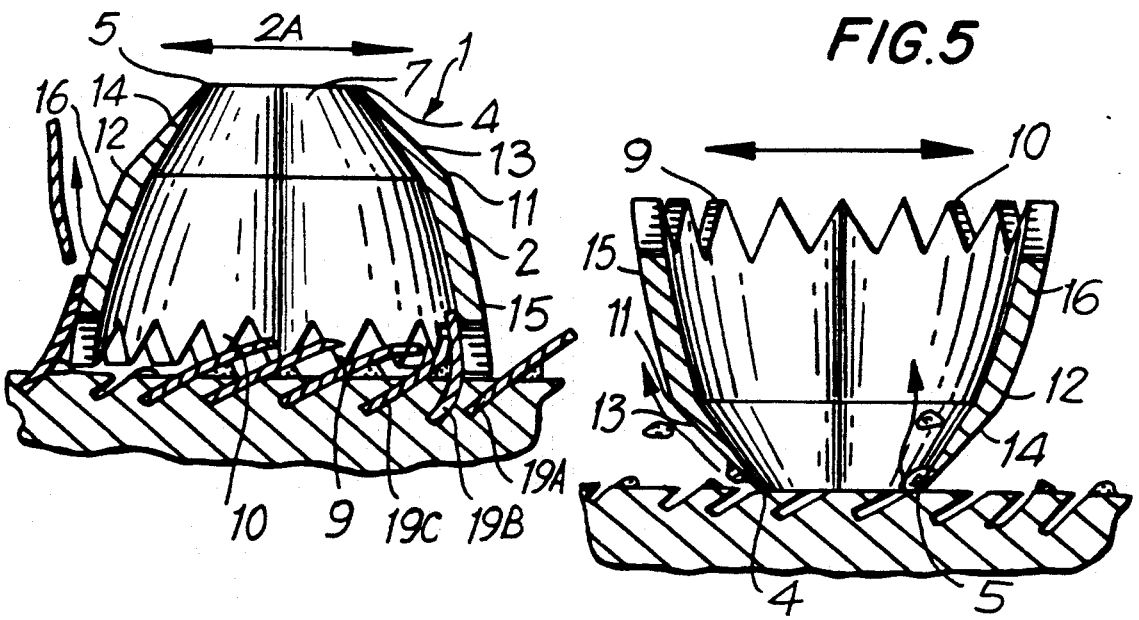

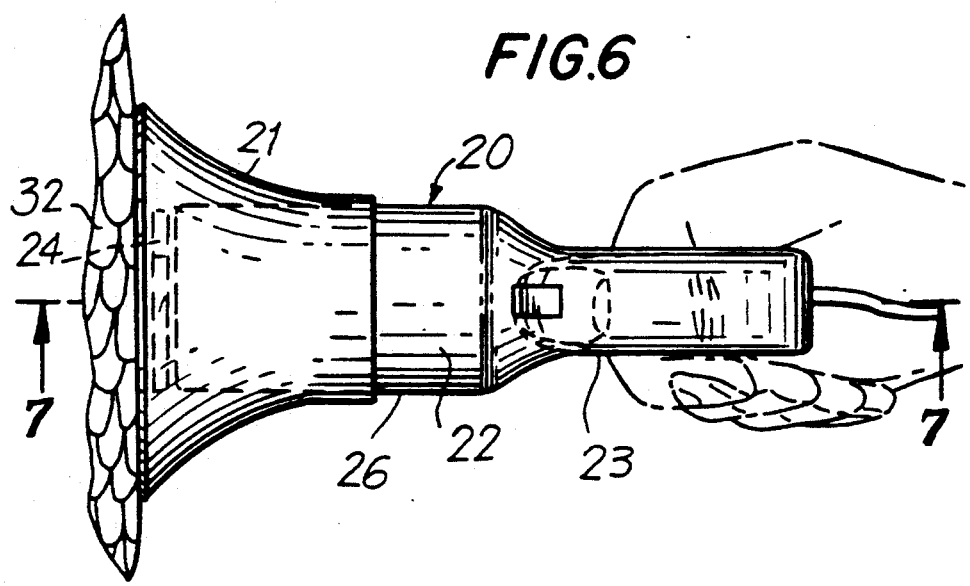
FIG.6
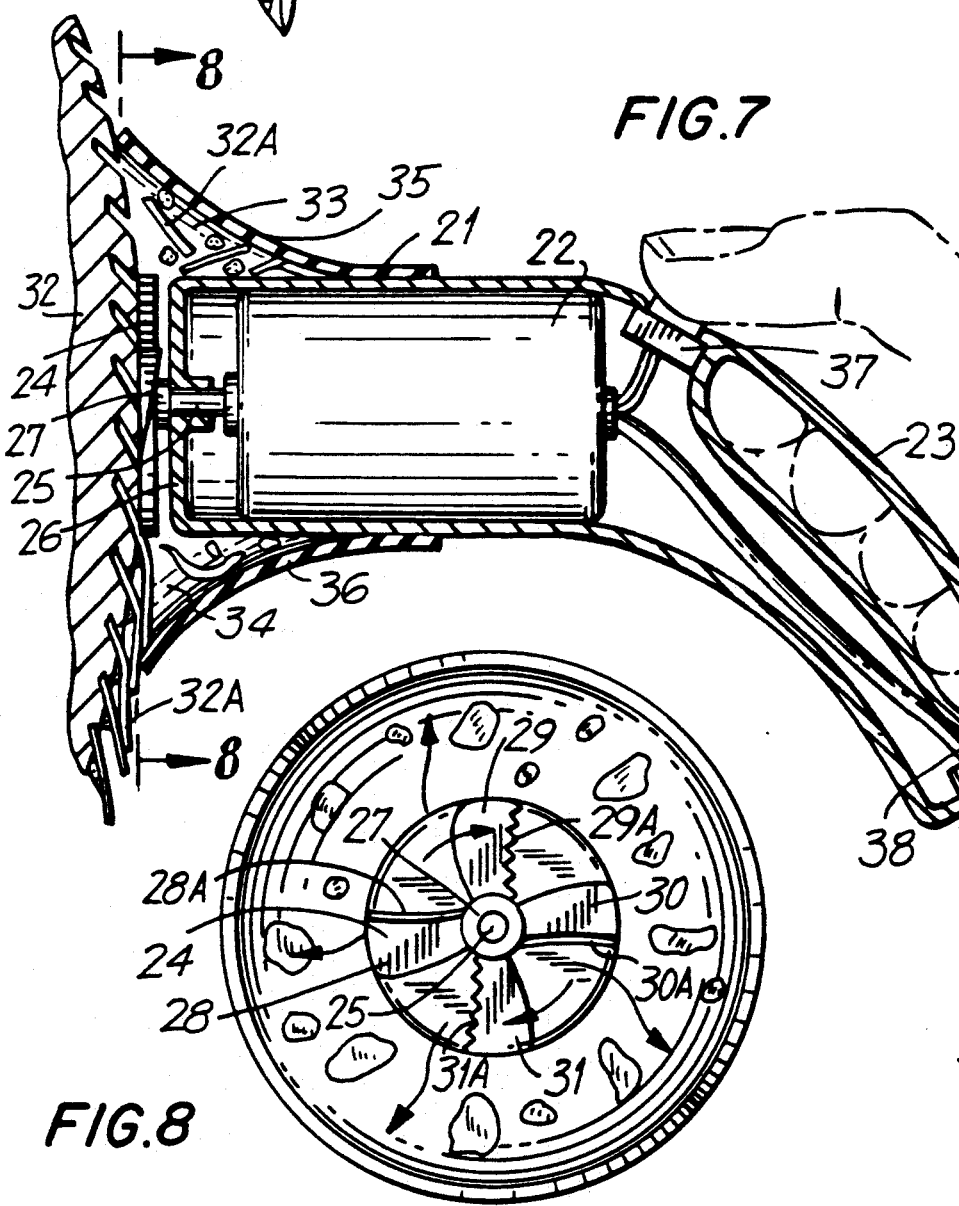
FIG.7
FIG.8

FISH CLEANING DEVICE

BACKGROUND OF THE INVENTION

1. Field of the Invention

The present invention relates to a fish scaling and cleaning device for use in cleaning fish, and is particularly surface responsive so as to have adjustable positions with regard to the curved or irregular skin surfaces of the fish. The invention preferably includes a mounted blade having dual blade surfaces which are surface responsive to different contours of scales and tissues being excised by the scaler. In the preferred embodiment the blade itself has a curvature responsive to the irregular curved surfaces of the fish.

An optional rotating cutting tool may be housed within a funnel housing with the cutting tool having sets of two types of blades which alternately cut the scales off the fish and then the underlying visceral tissues between the skin and the edible meat. In the optional version the rotary blades of the tool are rotated and held in position in a funnel shaped housing, which blades are rotated by a spindle connected to a conventional power means.

2. Discussion of the Prior Art

The prior art World Intellectual Property Organization Patent Document Number WO84/03024 of James describes a fish scaler with bristle filaments extending therefrom to scale a fish in one plane, in which the axis of rotation is parallel to the surface of the fish being scaled. U.S. Pat. No. 4,106,193 of Fisher describes rotating knives; however, the knives in Fisher scale a fish in one plane where the flat ends of the knives touch the fish. U.S. Pat. No. 4,297,765 of Altman depicts a round, non-rotating bristled brush with a water source. Moreover U.S. Pat. No. 4,761,856 of Ewing also describes a rotating cylindrical plurality of bristles in which the axis of rotation is parallel to the surface of the fish being scaled, without regard to the curvature of the surfaces of the fish.

None of these prior patents describe a fish scaling device which adapts to the curvature of the skin, nor which uses a dual set of blades, one serrated portion to remove the outer scales and a second sharper knife for removing visceral tissues underneath the skin and above the meat. Furthermore, none of the prior art patents describe a rotating set of blades wherein the axis of rotation of the blades is perpendicular to the surface of the fish being scaled and cleaned. Because the axis of rotation is perpendicular the axis of the rotating blades, the present invention can be moved in a curved fashion over and responsive to the curvature of the fish skin, while maintaining an efficient perpendicular orientation of the axis of rotation of the blades, thus assuring that the blades rotate perpendicular to the axis of rotation and parallel to surface of the skin being cleaned. In contrast, in the prior art patents, the fish itself must be moved and rotated because of the way the prior art devices generally operate in one plane.

OBJECTS OF THE INVENTION

An object of the invention is to provide a simple fish scaling device which would allow the user to follow the curvature of the surfaces of the fish and remove both scales and underlying visceral tissues.

A further object is to provide a simple tool which will allow the cleaning of the fish surfaces with a device which is responsive to the irregular surfaces of the fish.

It is a further object to provide a fish cleaning device which works well in cutting scales from the corners of the neck or the fins of the fish being cut.

It is a further object to provide an improvement over the existing prior art.

SUMMARY OF THE INVENTION

The device, according to the present invention, permits the dual cutting and scaling of the fish over curved irregular surfaces of the fish. It provides a dual sided curved knife, having a pair of convex surfaces with serrated surfaces for removing the visceral tissues of the fish. Opposite to the serrated surface of the knife there is provided another pair of convex sharp blades which are curved in a convex configuration to accommodate the removal of the underlying visceral tissues between the skin and the edible meat of the fish.

In an alternative embodiment, the device includes a rotating blade having dual sets of blades, one set of blades for alternately removing the scales with a serrated surface blade and a second set of generally sharper blades for removing the inner visceral tissues. In this version, a funnel shape housing covers the rotating sets of blades which cut the fish surfaces, and limits the discharge of the cut surfaces from the fish to a limited area. A rotating spindle moves the blade at the desired speed for operation.

The present invention is a simple, dual surface knife having a variation in the cutting edges, and with each cutting surface having a convex curvature to accommodate the curvature of the outer and inner skin surfaces of the fish. Even hard to scale sections, such as the neck and the fin areas, can be efficiently removed. Furthermore, because of the curved nature of the knife in the handle-mounted version, the skin and scale surfaces are more evenly removed, unlike those surface scales cut by other blades in one plane, wherein cutting requires a deeper cut to reach the lateral edges of the fish surfaces being scaled and cleaned.

DESCRIPTION OF THE DRAWINGS

The objections of the invention having been stated, other objects will appear when considering the final description, in connection with the accompanying drawings, in which:

FIG. 1 is a top plan view of one of the items of the device;

FIG. 2 is a side elevational view of the device as shown in FIG. 1;

FIG. 3 is a bottom plan view of the device as shown in FIG. 1;

FIG. 4 is a close-up sectional view of the device as shown in FIG. 2, taken along line 4—4, with the serrated surfaces down;

FIG. 5 is a close-up sectional view of the device as shown in FIG. 2, taken along line 4—4 in which the sharp blades are shown down against the surface of the fish;

FIG. 6 is a side elevational view of a rotating alternate embodiment of the invention;

FIG. 7 is a side sectional view of the device as shown in FIG. 6 viewed along line 7—7 of FIG. 6;

FIG. 8 is a bottom plan view of the device as shown in FIG. 7 taken along line 8—8 of FIG. 7.

LIST OF REFERENCE NUMERALS

| | LIST OF REFERENCE NUMERALS |
| --- | --- |
| 1. | Fish scaling device |
| 2. | Blade portion |
| 3. | Handle |
| 4 and 5. | Upper, sharp, smooth blade edge portion |
| 6. | Convergence end point of blade edges 4 and 5 |
| 6A. | Edge between end point 6 and blade tip 8 of blade edges 4 & 5 |
| 7. | Gap between end point 6 and blade 8 of blade edges 4 & 5 |
| 8. | Sharp tip of device |
| 9 and 10. | Serrated lower edge portions |
| 11 and 12. | Edge between blade surface portions 13 and 15 and 14 and 16 respectively |
| 13 and 14. | Upper blade curved surface portions |
| 15 and 16. | Lower blade curved surface portions |
| 17. | Upper neck end of blade portion 2 |
| 18. | Lower neck end of blade portion 2 |
| 19. | Fish tissue |
| 19A, B, C. | Fish scales |
| 101, 102, 103 | Serrated teeth of lower edge portion 9 |
| 101A, 102A, 103A | Serrated teeth of lower edge portion 10 |
| 20. | Rotary fish scaling embodiment |
| 21. | Funnel housing |
| 22. | Motor unit |
| 23. | Handle |
| 24. | Rotary blade |
| 25. | Spindle |
| 26. | Motor housing case |
| 27. | Connector between rotary blade 24 and spindle 25 |
| 28 and 30. | Sharp blades |
| 29 and 31. | Serrated blades |
| 29A and 30A. | Sharp blade edges of blades 28 and 30 |
| 29A and 31A | Serrated blade edges of blades 28 and 30 |
| 32. | Fish tissue |
| 32A. | Fish scale |
| 33 and 34. | Portions of gap within funnel housing 21 |
| 35 and 36 | Convex surface portions of funnel housing 21 |
| 37. | Control button |
| 38. | Power line |
| 39. | Plug |

DETAILED DESCRIPTION OF THE INVENTION

Referring to the drawing figures, as shown in FIG. 1 there is provided a fish scaling device 1 having a knife portion 2 attached to a manually operated handle 3. The knife portion 2 contains two generally sharp upper blade surfaces 4 and 5 extending each in a convex manner from a front portion 8 to a rear neck portion 17 of the blade, with the blades 4 and 5 converging at each end 6 and 17 of the blade 2. The convex blades form an inner hole 7 defined in the gap between blades 4 and 5. The front end of the knife 2 ends at a lower point tip 8 at the convergence of lower serrated surfaces 9 and 10, which extend from end point 8 to lower neck portion 18 of the fish scaling device 1. The convex blade portions of the knife 2 are divided by joint lines 11 and 12 separating respectively upper blade surfaces 13 and 14 with lower blade surfaces 15 and 16, which lower blade surfaces 15 and 16 are joined to serrated bottom portions 9 and 10, respectively.

As shown in FIG. 2 in elevational profile the blade 2 has convex curved surfaces 4 and 5 which curve downward and meet the front point 6 where a further joining surface 6A meets with end point 8. As shown in FIG. 3 from the bottom, the serrated portions 9 and 10 have serrated teeth 101, 101A, 102, 102A, 103, 103A, etc. extending along the length of lower of surfaces 9 and 10 of the blade 2.

When scaling the outer scale portions of the fish the serrated portions 9 and 10 are used while the knife is moved in a lateral direction 2A, as shown in FIG. 4. The serrated portions remove the scaled outer surfaces to expose the visceral tissues underneath. However, to remove the visceral tissues it is necessary to cut open the fish and then clean out the visceral surfaces within the generally concave inner skin portions of the fish being cleaned. In that case, the curved convex knife portions 4 and 5 accommodate and conform to the different concave inner surfaces of the fish, to remove the generally black visceral tissues of the fish beneath the skin and above the edible meat portions. Furthermore, the knife portions 4 and 5 can remove unedible organ parts as well.

In the alternate rotating version, as shown in FIGS. 6, 7 and 8 there is provided a fish scaling device 20 having funnel shaped housing 21 within which motor unit 22 is housed. Motor unit 22 is disposed to handle portion 23, having finger-thumb operable button portion 37 for transferring power from conventional cord 38 and electrical outlet source 39. In the alternative, the outlet source can be battery operated.

The funnel shaped portion 21 accommodates and catches within hollow portions 33 and 34 the scale portions 32A being removed from the fish skin 32. Blade 24 is movable about spindle 25 connected to the motor unit 22. Spindle unit 25 is disposed to blade 24 by joining means 26. The spindle 25 moves the guiding portion 26 of the unit 22. Blade 24 is held in place by connector 27, and rotates in a clockwise manner as shown in FIG. 8.

As noted before, the fish scaling device requires a serrated knife portion in combination with a generally sharp blade type portion. Therefore the fan shaped blade 24 includes a plurality of blades 28, 29, 30 and 31, which blades 28, 29, 30 and 31 have alternate blade portions. For example, blade 28 has generally sharp blade surface 28A, while blade 29 has serrated surface 29A. Further blade portion 30 contains generally sharp blade portion 30A, and blade portion 31 contain serrated portions 31A. The serrated portions 29A and 31A are placed between the sharp blade portions 28A and 30A. Upon rotating the spindle 25, the first serrated portions 29A and 31A remove the scales 32A of the fish from the curved skin of the fish body. Thereafter, to remove the under surface tissues, the sharper blade portions 28A and 30A remove the visceral underportions of the fish tissues. The convex flanged wall sections 35 and 36 of the funnel shaped unit 21 catch flying fish scales being cut so that the scales and cut tissue portions do not fly outside of the cutting site to any considerable degree.

Therefore, the fish scaling device is provided with dual rotating sets of blades accommodating the removal of the two different surfaces of the fish to be cleaned, namely, the scaly outer surfaces and the under visceral surfaces, which both surfaces require different types of blades for efficient removal of same.

The orientation of the rotating blades 28, 29, 30 and 31 is important to permit the blades to travel over the curved surfaces of the fish being cleaned. As shown in FIGS. 7 and 8 the axis of rotation of the planes of blades 28, 29, 30 and 31 is perpendicular to the surface of fish, so that the blades rotate in a plane parallel to a line tangent to the surface of the fish. Therefore the rotating blades 28, 29, 30 and 31 can be moved across the curved surfaces of the fish.

Furthermore, in the preferred manually operated embodiment, the blade 2 has convex curvatures on the sharp blade surface portions 4 and 5 to accommodate reaching within the concave inner portions of the fish body for cleaning the inner visceral tissues efficiently, in hard to reach places.

Having described preferred embodiments of the invention with reference to the accompanying drawings, it is to be understood that the invention is not limited to those particular embodiments and that various changes and modifications may be made by one skilled in the art without departing from the spirit and scope of the invention as described in the appended claims.

I claim:

1. A fish scaling and cleaning device comprising a dual blade surface cutting portion having a plurality of second smooth, generally sharp surface portions, said first and second portions responsive to the surface irregularities of the fish being cut;

wherein said second smooth, generally sharp cutting portion includes a pair of upper convex blades; said blades having a pair of end points at which each of said convex blades converge, said generally sharp, smooth blades disposed opposite said first convex serrated portions, said second portions being a pair of convex serrated blade surfaces, each serrated blade surface ending in mutually opposite end points, said first generally sharp smooth blade portions and said second convex serrated portions being spaced apart from each other.

2. The invention as in claim 1 further comprising wherein each said second smooth, generally sharp upper convex blade is separate from each other upper convex blade and said upper convex blades define a gap therebetween and each of said first convex serrated blade surfaces is separate from each other of said convex serrated blades and said convex serrated blades define a further gap therebetween.

3. The invention as in claim 1 wherein said plurality of said second upper generally sharp blades extend outwardly and downwardly toward said first serrated blade surfaces in mutually opposite convex directions.

4. A fish scaling and cleaning device comprising a means for alternately cleaning and scaling fish with outer skin scales and inner tissues, said means comprising a rotating fan-type blade having alternate serrated and sharp, smooth blades, rotating about a spindle having an axis about which said spindle rotates, said fan-type blade movably connected to a power source; said power source and said blade being housed within a funnel shaped housing providing a gap within which said fish scales and tissues being alternately cut by each said serrated blade and each said sharp smooth blade are retained within said funnel shaped housing during said cleaning and scaling of said fish, and further wherein said axis of rotation of said blades rotatable perpendicular to an outer surface of said fish, said blades rotatable in a plane parallel to a line tangent to said outer surface of said fish, said serrated blades removing said outer skin scales and said smooth, sharp blades capable of removing said inner tissues of said fish.

* * * * *